United States Patent [19]
Schieler et al.

[11] Patent Number: 6,062,400
[45] Date of Patent: May 16, 2000

[54] SPLIT BEAM ERGONOMIC PICK RACK

[75] Inventors: Richard F. Schieler, York, Pa.; David A. Ludden, Auburndale, Mass.

[73] Assignees: St. Onge, Ruff and Associates, Inc., York, Pa.; Hannaford Bros. Co., Scarborough, Me.

[21] Appl. No.: 08/907,858
[22] Filed: Aug. 8, 1997
[51] Int. Cl.[7] .............................. A47F 5/08; A47B 43/00; E04G 7/00
[52] U.S. Cl. ........................ 211/151; 211/191; 182/178.1
[58] Field of Search ................................... 211/151, 183, 211/189, 190, 191; 182/178.1

[56] References Cited

U.S. PATENT DOCUMENTS

| 3,323,655 | 6/1967 | Foran et al. | 211/134 |
|---|---|---|---|
| 3,659,723 | 5/1972 | Konstant | 211/151 |
| 4,117,938 | 10/1978 | Klein | 211/191 |
| 4,453,641 | 6/1984 | Rasmussen et al. | 211/151 |
| 5,273,170 | 12/1993 | Azzopardi et al. | 211/189 |
| 5,964,361 | 10/1999 | Mefford et al. | 211/189 |

*Primary Examiner*—Daniel P. Stodola
*Assistant Examiner*—Erica B. Harris
*Attorney, Agent, or Firm*—Samuel M. Learned, Jr.

[57] ABSTRACT

A split beam ergonomic pick rack which embodies a pallet storage bay structure adapted to accommodate at least two pallets in a laterally spaced relationship one with respect to the other whereby there is incorporated a worker access opening therebetween which enables not only worker access for picking merchandise from the front of either pallet within the bay, but also accommodates worker passage from the front to along the sides and the rear areas respectively thereof, thus providing greater worker ease of access, safety and efficiency in accomplishing manual order picking procedures when retrieving palletized merchandise from in warehouse racked storage.

3 Claims, 7 Drawing Sheets

Fig. 1

SPLIT BEAM ERGONOMIC PICK RACK

BACKGROUND OF THE INVENTION

This invention relates to storage racks of that type installed in warehouses for the support of palletized merchandise, particularly to those designated storage rack sites which are utilized for order picking procedures by warehouse workers in fulfillment of order quantities for less than full palletized load amounts, and even more particularly to a split beam ergonomic pick rack which embodies a pallet storage bay structure adapted to accommodate at least two pallets in a spaced relationship one to the other whereby there is incorporated a worker access opening therebetween which enables a worker not only access for picking merchandise from the front of either pallet, but passage also from the front along the respective sides and to the rear areas thereof, thus providing greater worker ease, safety and efficiency in manual order picking procedures when retrieving palletized merchandise from racked in warehouse storage.

Storage rack structures which provide spaced openings are those designed to admit entry of a fork lift truck for ease of positioning and depositing fully palletized loads for storage, commonly referred to as drive-in racks such as those exemplified by the teachings respectively in U.S. Pat. No. 3,323,655 to Foran et al. dated Jun. 6, 1967 and U.S. Pat. No. 5,273,170 to Azzopardi et al. dated Dec. 28, 1993.

In another teaching, as shown in U.S. Pat. No. 4,117,938 to Klein dated Oct. 3, 1978, a protector arm assembly is shown for a fork lift truck drive-in type pallet storage rack wherein the protector arm is mounted to a front vertical rack support post beneath an extended pallet rail so as to forwardly project from the post to serve as a bumper for preventing injuries to personnel and loads resultant from striking the end of an extended pallet rail. The protector arm attachment, however, is not a load bearing member per se with regard to loaded pallet support, nor is it intended or function as such, and it does not provide worker access between pallets for enhanced order picking procedures.

An alternate version of the split beam ergonomic pick rack of instant invention embodies the use of inclined side-by-side inflow and outflow roller conveyor sections, wherein the depth of the storage bay is sufficient to accommodate at least two loaded pallets one behind the other on either side of the split beam, which creates a worker access opening therebetween for allowing order picking procedures from the inflow section side. Exemplary teachings which show the use of inclined side-by-side roller conveyor sections, but without the split beam structural features, are as respectively taught in U.S. Pat. No. 3,659,723 to Konstant dated May 2, 1972, and U.S. Pat. No. 4,453,641 to Rasmussen et al. dated Jun. 12, 1984.

The applicants herein, however, by their invention provide a convenient new and novel ergonomic pick rack by means of their split beam structure, whereby manual order picking workers are provided with greater and easier access to rack stored palletized merchandise so that their jobs may be accomplished with greater safety and efficiency.

SUMMARY OF THE INVENTION

It is the principal object of the present invention to provide a split beam ergonomic pick rack which incorporates a pallet storage bay structure adapted to accommodate at least two pallets in a laterally spaced relationship one with respect to the other whereby a worker access opening therebetween accommodates worker passage along the sides and to the rear areas of each of the subject pallets to thereby provide greater worker ease of access, safety and efficiency in accomplishing manual order picking procedures when retrieving palletized merchandise from in warehouse racked storage.

It is another object of the present invention to provide an alternate embodiment split beam ergonomic pick rack which incorporates the use of inclined side-by-side roller conveyor sections for gravity feed of pallets, wherein the storage bay depth of the alternate embodiment version is sufficient to accommodate at least two loaded pallets one behind the other on either side of the split beam worker access opening therebetween.

It is also an object of the present invention to provide a warehouse storage rack structure adapted to incorporate at designated storage rack sites the split beam ergonomic pick rack invention hereof, in both the preferred and alternate embodiment versions thereof.

It is yet another object of the present invention to provide a split beam ergonomic pick rack structure, in both the preferred and alternate embodiment versions thereof, which are adapted by clear unobstructed rack profiles to enable facilitated service with power-driven lift equipment in moving palletized merchandise loads into and out of the racks. The foregoing, and other objects hereof, will be readily evident upon a study of the following specification and accompanying drawings comprising a part thereof.

DETAILED DESCRIPTION OF THE INVENTION

Figure 1:
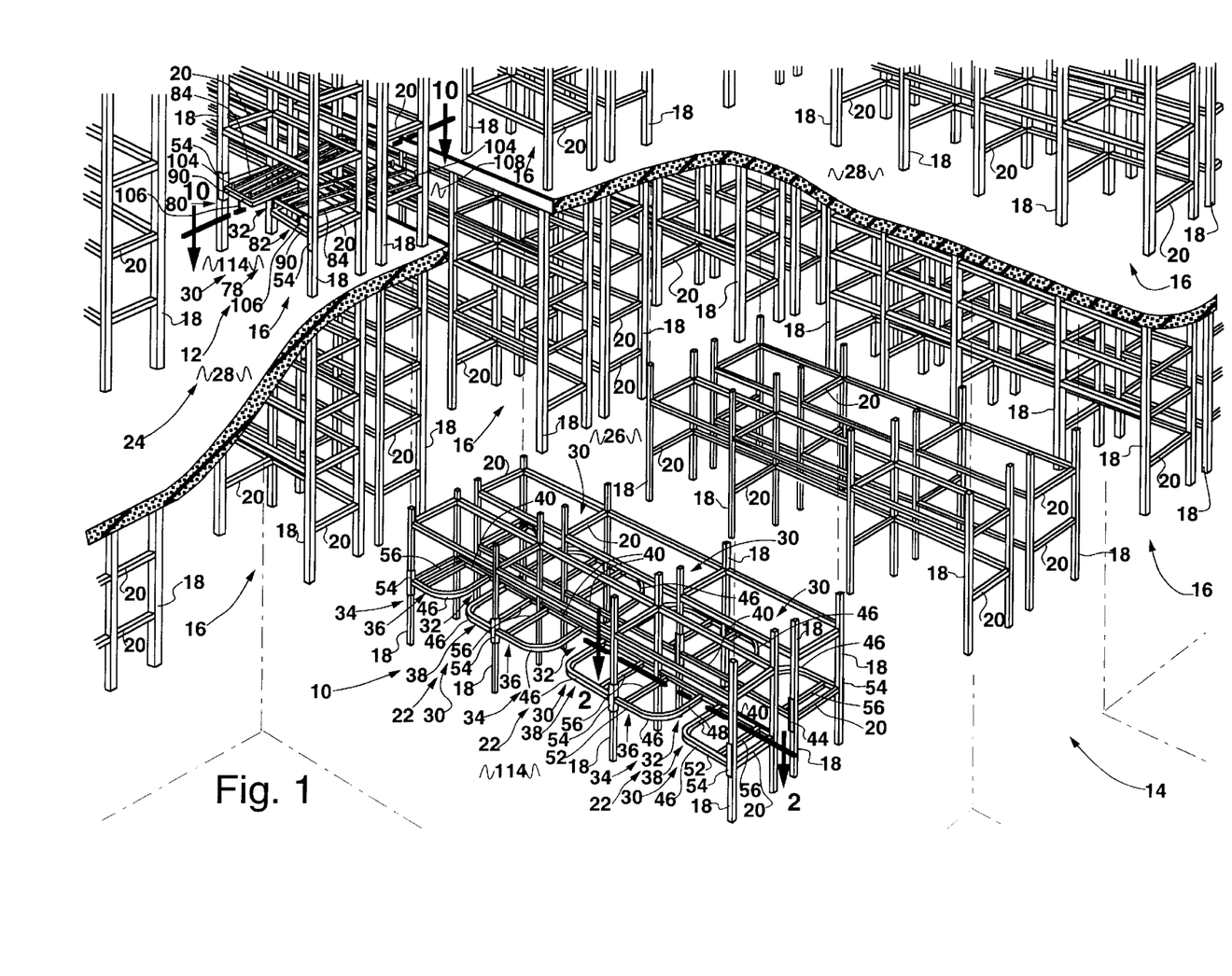
FIG. 1 is a fragmentary front perspective elevation view of an exemplary warehouse storage rack installation therein illustrating incorporation of the split beam ergonomic pick rack of instant invention, as well as also the alternate embodiment version thereof.

Referring to FIG. 1, the split beam ergonomic pick rack 10 and alternate embodiment version 12 thereof, and the component parts respectively comprising the same are shown installed in an exemplary warehouse 14 equipped with an installation of exemplary warehouse rack support structures 16 in turn being comprised of interconnected vertical and horizontal rack support post 18 and beam 20 members. Preferably, since the split beam ergonomic pick racks 10 and 12 hereof provide for enhanced ease of worker access for accomplishing manual order picking procedures when retrieving palletized merchandise from in warehouse racked storage, as will hereinafter be more fully described and explained, the rack 10 and 12 installation sites will be at the lower and upper floor level rack bay positions 22 and 24 respectively, wherein the lower floor would typically be the warehouse ground floor level 26 and the upper floor would be a warehouse mezzanine floor level 28 such as is currently common and well known in present rack storage warehouse installation design and construction. It will be further noted as shown in FIG. 1, that both the ergonomic pick racks 10 and 12 embody a split beam structure which provides for the racking within a pallet storage bay 30 of at least two pallets in a laterally spaced relationship one with respect to the other, whereby there is incorporated a worker access opening 32 therebetween which enables not only worker access for picking merchandise from the front of either pallet within the bay 30, but accommodates also worker passage from the front to along the sides and rear areas respectively thereof.

Figure 2:
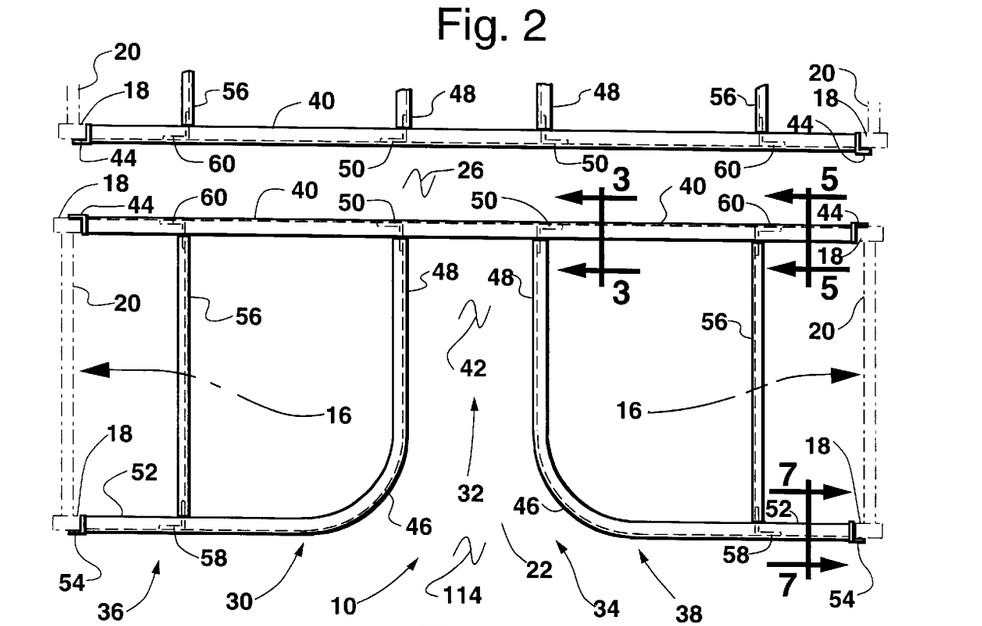
FIG. 2 is an enlarged top plan view of the split beam ergonomic pick rack as shown in FIG. 1 and seen along the line 2—2 thereof

Referring now to the top plan view of FIG. 2 to consider in greater detail the structural and installation features of the ergonomic pick rack 10, wherein is shown a single pallet storage bay 30 configured with a laterally spaced dual pallet storage 5 profile 34 to provide the worker access opening 32, wherein it will be noted that the profile 34 embodies a laterally spaced set of mirror image pallet storage support racks 36 and 38 interconnected by a common rear horizontal support beam 40 held in a plane parallel to that of the lower floor level 42 by means 10 of connector brackets 44 welded to the respective lateral ends of said beam 40 which brackets 44 are in turn cooperatively bolted to the rear vertical rack support posts 18. Each pallet storage support rack 36 and 38, comprising the laterally spaced dual pallet storage profile 34, further includes as structural elements respectively thereof, a curved right-angled pallet support and bumper beam 46 connected at the respective rearwardly projecting leg 48 ends thereof in a spaced centrally intermediate position to the rear horizontal support beam 40 each by means of a rear support beam bracket 50 in a laterally spaced relationship one to the other so as to provide the worker access opening 32. At the respective forward facing, outwardly projecting leg 52 ends thereof, in a coequally spaced, parallel relationship to the rear horizontal support beam 40, the leg 52 ends are connected by means of a vertical support post bracket 54 to a forward vertical support post 18 cooperatively interconnected by means of a horizontal rack support beam 20 in the warehouse rack support structure 16 which is in turn connected to the rearward vertical rack support post 18 to which the rear horizontal support beam 40 is connected brackets 44. Additionally, the pallet storage support racks 36 and 38 each have a stabilizing rack support beam 56, which is parallel to the rearwardly projecting leg 48, that interconnects the rear horizontal support beam 40 to the forward facing outwardly projecting leg 52 in a set and is connected by means of forward and rearward brackets 58 and 60.

Fabrication of the split beam ergonomic pick rack 10 as shown and illustrated in FIGS. 1 and 2, and the alternate embodiment version 12 thereof as also illustrated in FIG. 1 and certain subsequent Figures hereinafter, may be by casting or rolling or machining from various metals and alloys thereof, or structural plastics, or combinations of metals and metal alloys and plastics by methods and techniques well known and commonly employed in such operations.

Figure 3:
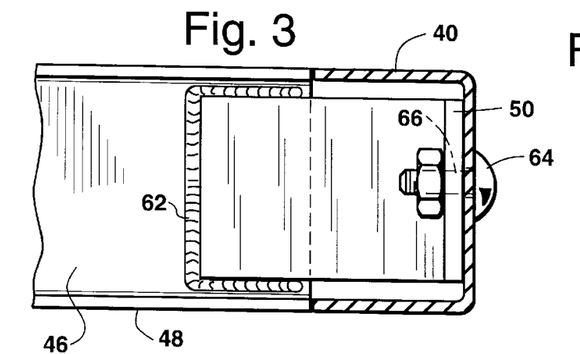
FIG. 3 is an enlarged side elevation view of the hardware assembly connection means as shown in FIG. 2 and seen along the line 3—3 thereof.
Figure 4:
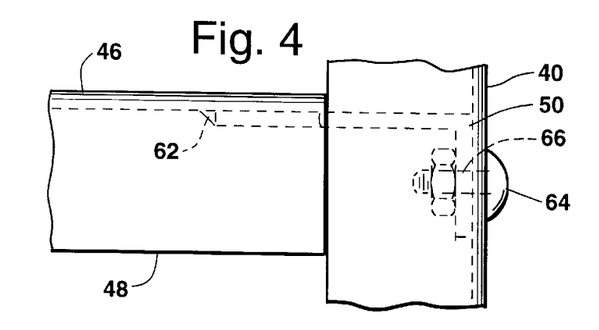
FIG. 4 is a top plan view of the hardware assembly connection means shown in FIG. 3.

Turning attention now to FIGS. 3 through 8 inclusive, wherein are shown enlarged side elevation and corresponding top plan views of the various split beam ergonomic pick rack 10 hardware assemblies and the means for connection respectively thereof, and in so doing considering first the rear support beam bracket 50 assembly shown in FIG. 3 as seen along the line 3—3 of FIG. 2. The function of the rear support beam bracket 50 is to connectably assemble the end of the rearwardly projecting leg 48 of the curved right-angled pallet support and bumper beam 46, in this case as a component of the pallet storage support rack 38, to the rear horizontal support beam 40 in a laterally spaced relationship to the other such assembly, being the rearwardly projecting leg 48 of the curved right-angled pallet support and bumper beam 46 of the pallet storage support rack 36, whereby there is provided the worker access opening 32 of the laterally spaced dual pallet storage profile 34 within the pallet storage bay 30 of said split beam ergonomic pick rack 10. As shown in FIGS. 3 and 4, the rear support beam bracket 50 is assembled to the rearwardly projecting leg 48 end of the curved right-angled pallet support and bumper beam 46 inner channel surface by means of a rear support beam bracket weld 62. The weldably affixed bracket 50 is then employed, by means of a rear support beam bracket nut and bolt assembly 64 inserted through communicating openings 66, to connectably join the rearwardly projecting leg 48 of the curved right-angled pallet support and bumper beam 46 to the rear horizontal support beam 40 as shown. Connectable assembly of the mirror-imaged rearwardly projecting leg 48 of the curved right-angled pallet support and bumper beam 46 of the pallet storage support rack 36, comprising in combination with the rack 38 the laterally spaced dual pallet storage profile 34 within the pallet storage bay 30 of said split beam ergonomic pick rack 10, is likewise accomplished by a similarly assembled and connectable bracket 50 structure employing a nut and bolt assembly 64 insertably communicating through openings 66 as previously described.

Figure 5:
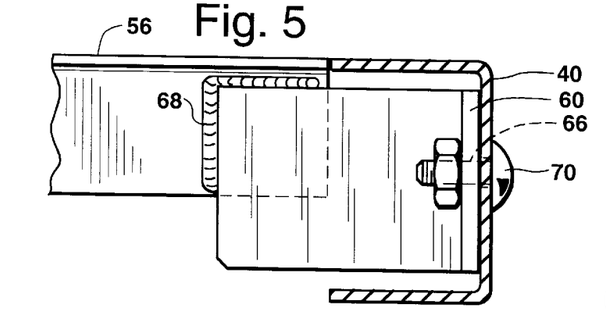
FIG. 5 is an enlarged side elevation view of the hardware assembly connection means as shown in FIG. 2 and seen along the line 5—5 thereof.
Figure 6:
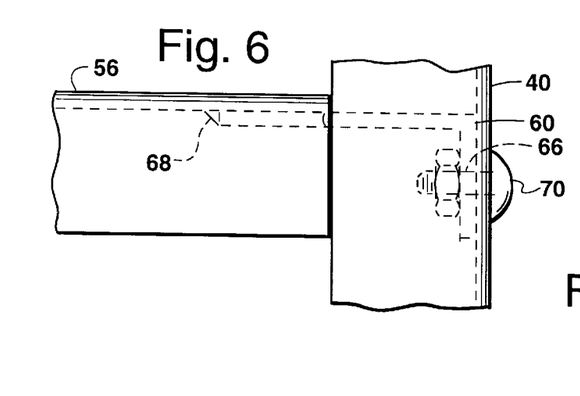
FIG. 6 is a top plan view of the hardware assembly connection means shown in FIG. 5.
Figure 9:
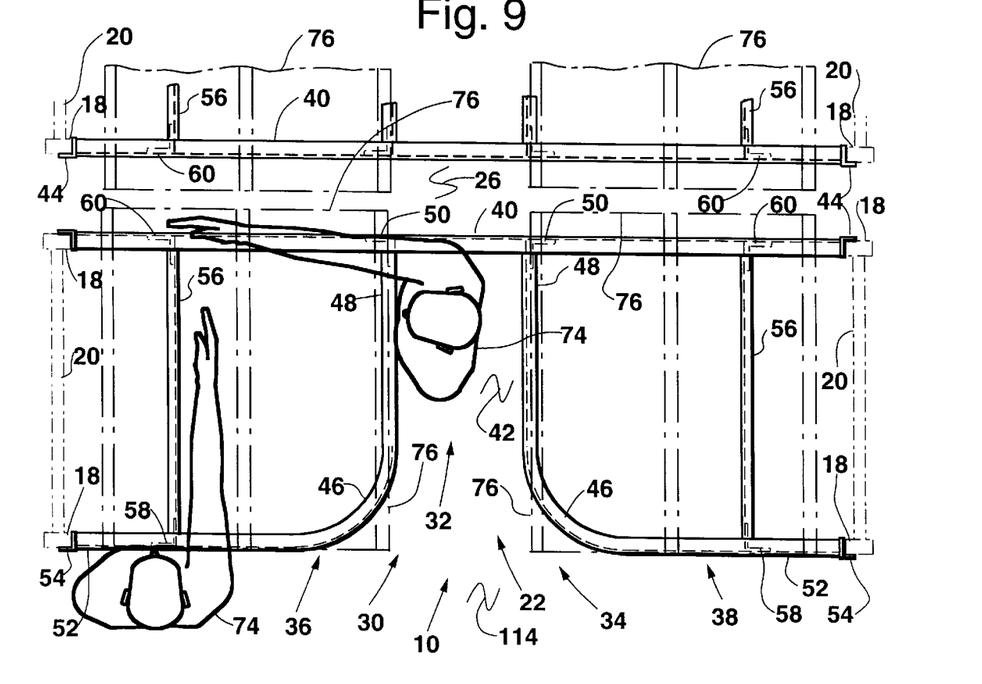
FIG. 9 is a top plan view of the split beam ergonomic pick rack similar to that as shown in FIG. 2, but herein illustrating improved worker access to an exemplary pallet positioned thereon.

Considering now the rearward bracket 60 assembly shown in FIG. 5 as seen along the line 5—5 of FIG. 2. The function of both the rearward bracket 60 and the forward bracket 58 cooperative therewith, respectively connected to opposing ends of the stabilizing rack support beam 56 by a bracket weld 68, is to provide for connectable stabilizing assembly of the rack support beam 56 between the rear horizontal support beam 40 and the forward facing outwardly projecting leg 52 of the curved right-angled pallet support and bumper beam 46 as shown in FIGS. 2 and 9. By means of a bracket nut and bolt assembly 70 inserted through communicating openings 66, the weldably affixed forward and rearward brackets 58 and 60 are respectively connectably joined to assemble the stabilizing rack support beam 56 in the manner as above-described. Connectable assembly of the mirror-imaged stabilizing rack support beam 56 of the split beam ergonomic pick rack 10 is likewise accomplished by similarly assembled and connectable bracket 58 and 60 structures employing nut and bolt assemblies 72 insertably communicating through openings 66 as previously described.

Figure 7:
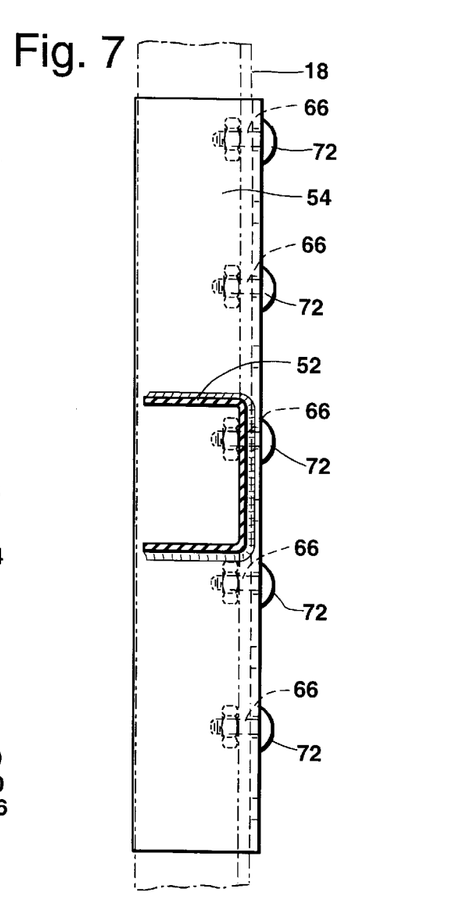
FIG. 7 is an enlarged side elevation view of the hardware assembly connection means as shown in FIG. 2 and seen along the line 7—7 thereof.
Figure 8:
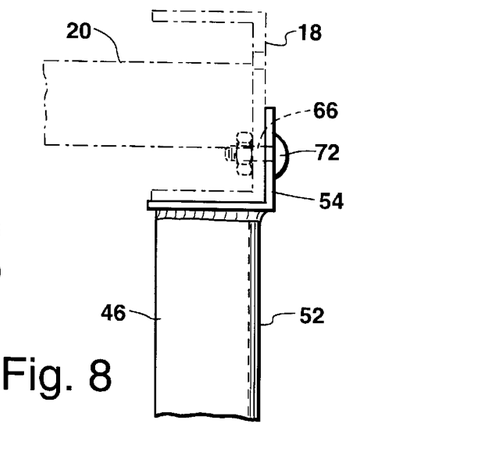
FIG. 8 is a top plan view of the hardware assembly connection means shown in FIG. 7.

Referring now to the vertical support post bracket 54 shown in FIG. 7 as seen along the line 7—7 of FIG. 2, which is the assembly means whereby the forward facing outwardly projecting legs 52 of the respective curved right-angled pallet support and bumper beams 46 are connected to the vertical rack support posts 18 as shown also in FIGS. 1 and 9. Again, assembly connection is accomplished by the employment of nut and bolt assemblies insertably secured through communicating openings 66.

Referring next to the top plan view of the split beam ergonomic pick rack 10 as shown in FIG. 9, which illustrates the advantageous exemplary order picker worker 74 access features thereof for facilitated order picking procedures. As shown, in a pallet storage bay 30 which embodies the split beam ergonomic pick rack 10 structure, the spaced pair of pallet storage support racks 36 and 38 provide the worker access opening 32 whereby an order picker worker 74 has not only reachable order picking access to the product loaded upon the forward-facing aisle area of the pallet 76, but also passage access therebetween by means of said opening 32 for enhanced and facilitated order picking access to product loaded upon rear areas of the pallet 76. Thus, the split beam ergonomic pick rack 10 structure hereof accommodates worker 74 passage from the forward to along the sides and rear areas of pallets 76 stored on racks 36 and 38 of said pick rack 10 structure to thereby provide greater worker 74 ease of access, safety and efficiency in accomplishing manual order picking procedures when retrieving palletized merchandise from in warehouse racked storage.

Figure 10:
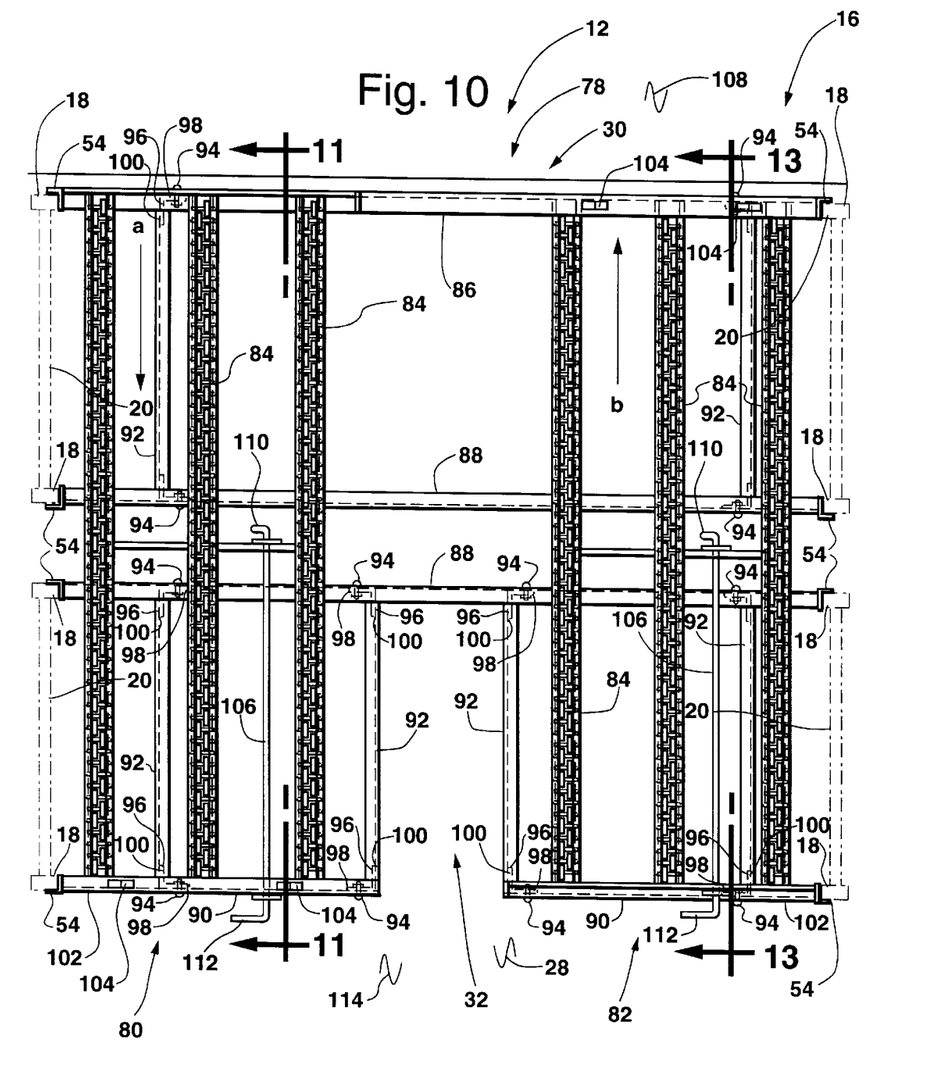
FIG. 10 is an enlarged top plan view of the alternate embodiment split beam ergonomic pick rack as shown in FIG. 1 and seen along the line 10—10 thereof.
Figure 12:
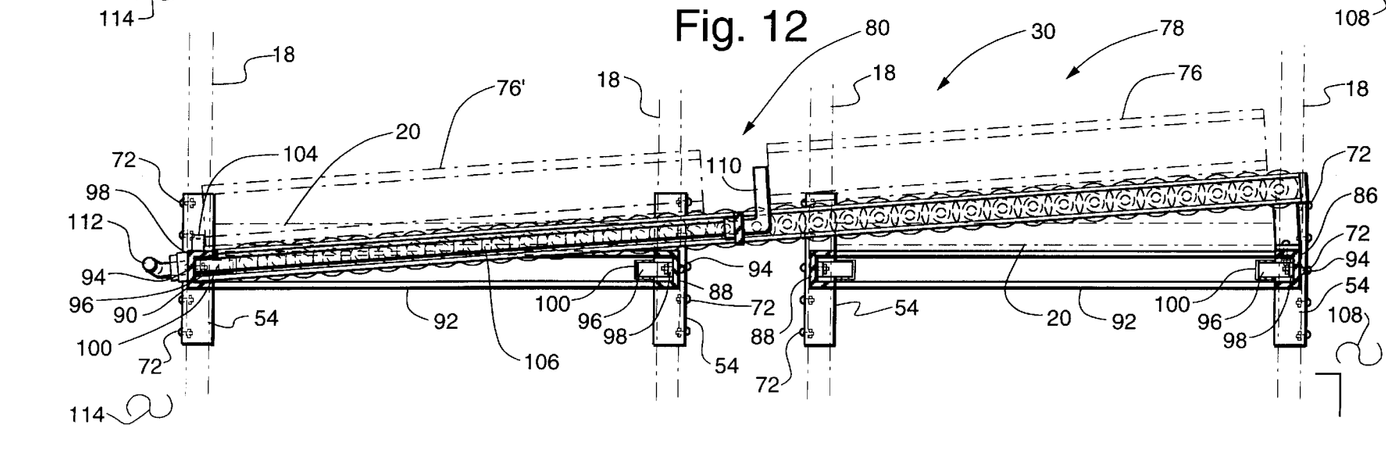
FIG. 12 is an enlarged side elevation view of the alternate embodiment split beam ergonomic pick rack inflow roller conveyor section side similar to that as previously shown in FIG. 11, herein, however, further showing the loading of multiple pallet loads thereon to illustrate operation of the pallet stop assembly.
Figure 14:
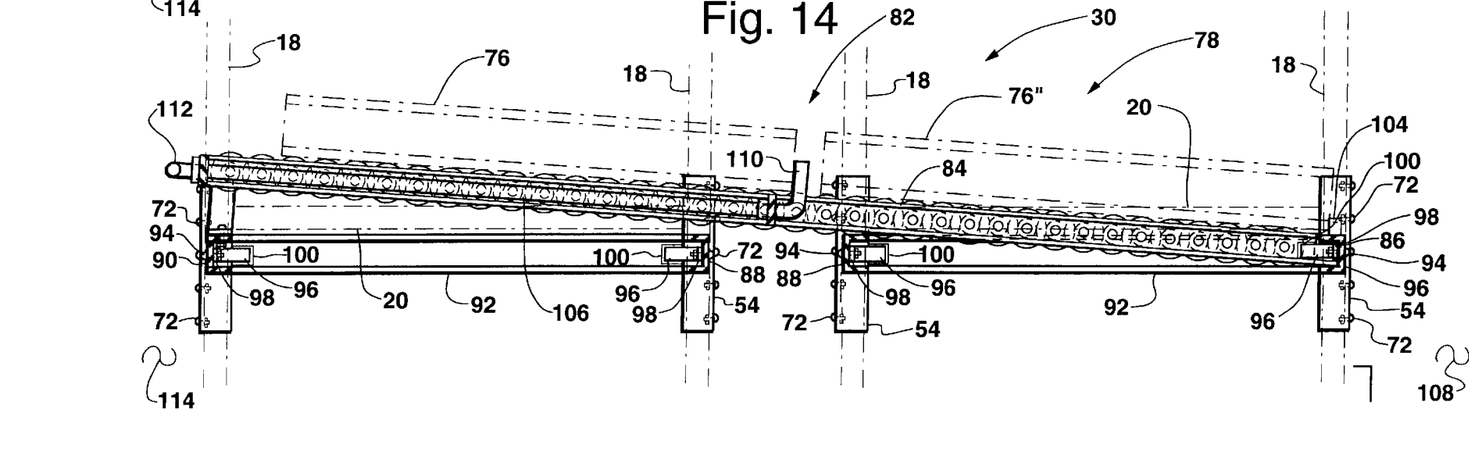
FIG. 14 is an enlarged side elevation view of the alternate embodiment split beam ergonomic pick rack outflow roller conveyor section side similar to that as previously shown in FIG. 13, herein, however, further showing the loading of multiple pallet loads thereon to illustrate operation of the pallet stop assembly.
Figure 15:
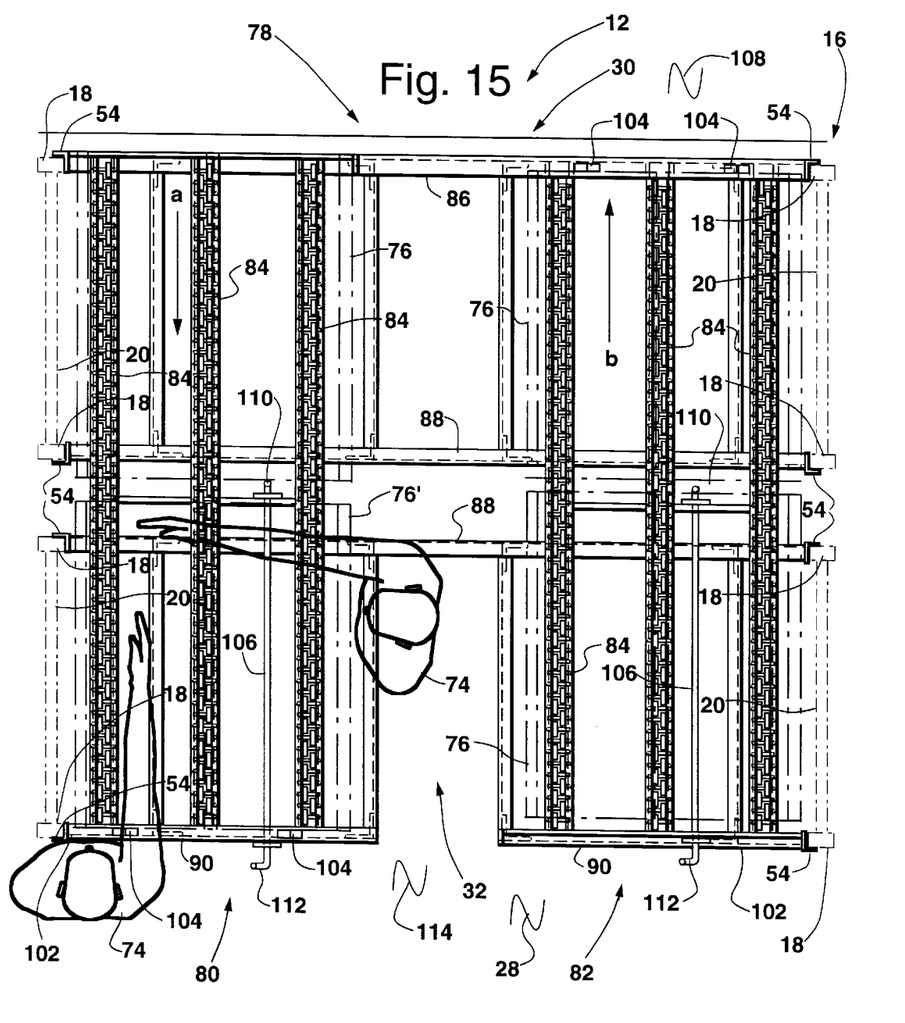
FIG. 15 is a top plan view of the alternate embodiment split beam ergonomic pick rack as shown in FIG. 10, but herein illustrating improved worker access to an exemplary pallet positioned thereon.

Turning attention now to FIG. 10, wherein a top plan view of the alternate embodiment split beam ergonomic pick rack 12 is shown, being distinguished by having an elongated pallet storage bay 78 structure formed by a spaced set of cooperative inclined roller conveyor pallet storage support racks 80 and 82, each of which further incorporates a regularly spaced plurality of elongated inclined roller conveyor members 84 whereby each rack 80 and 82 of the alternate embodiment pick rack 12 structure loads at least a dual set of pallets 76 in tandem on the roller conveyor members 84 as shown in FIGS. 12, 14 and 15. Otherwise, the alternate embodiment split beam ergonomic pick rack 12 structure likewise provides the worker access opening 32 as previously described for facilitated and enhanced worker reachable recovery of product for order picking from pallet loaded product stored on rack 80 which is a pallet inflow rack, whereas rack 82 is a pallet outflow rack.

In order to accommodate at least a dual set of pallets in tandem on each inclined roller conveyor pallet storage support rack 80 and 82 it is necessary to utilize two pallet storage bays 30 in a back-to-back relationship in order to provide one elongated pallet storage bay 78 as shown in FIGS. 1 and 10 through 15, wherein the front horizontal support beam of the rear pallet storage bay then becomes the back horizontal support beam 86 of the elongated pallet storage bay 78 and the respective rear horizontal support beams then function as the intermediate horizontal support beams 88 thereof, with the forward horizontal support being provided by the laterally spaced right-angled support and bumper beams 90 between which the worker access opening 32 is provided. As before, welded on connector brackets 54 serve to connectably join by nut and bolt assembly means 72 the outward terminal ends of the cross member support beams 86, 88 and 90 to the respective vertical rack support posts 18 of the warehouse rack support structure 16 as shown in FIG. 10.

The laterally spaced right-angled support and bumper beams 90 of the respective inclined roller conveyor pallet storage support racks 80 and 82 are equivalent structural components, between which, as previously described the worker access opening 32 is provided. The respective laterally spaced rearwardly projecting parallel legs 92 of the right-angled support and bumper beams 90 are assembled in a centrally intermediate laterally spaced relationship to the forward-facing intermediate horizontal support beam 88 by means of nut and bolt 94 connectable assembly thereto of the leg and weldably joined brackets 96. The rearwardly projecting leg 92 is in turn connected at right angles at the forward facing end thereof to the forward facing outwardly projecting leg 98 of said right-angled support and bumper beam 90 by means of a weldably joined right angle bracket 100, and as previously described, the respective forward facing outwardly projecting legs 98 are connected at the outward ends 102 respectively thereof to the corresponding vertical rack support post 18 of the warehouse rack support structure 16 vertical support post brackets 54. Further stabilizing the overall alternate embodiment split beam ergonomic pick rack 12 structure as tie-in connectors of the cross member support beams 86, 88 and 90 are the interconnecting horizontal rack support beams 20, which also connectably join the vertical rack support posts 18 of the warehouse rack support structure 16 as was previously described.

Figure 11:
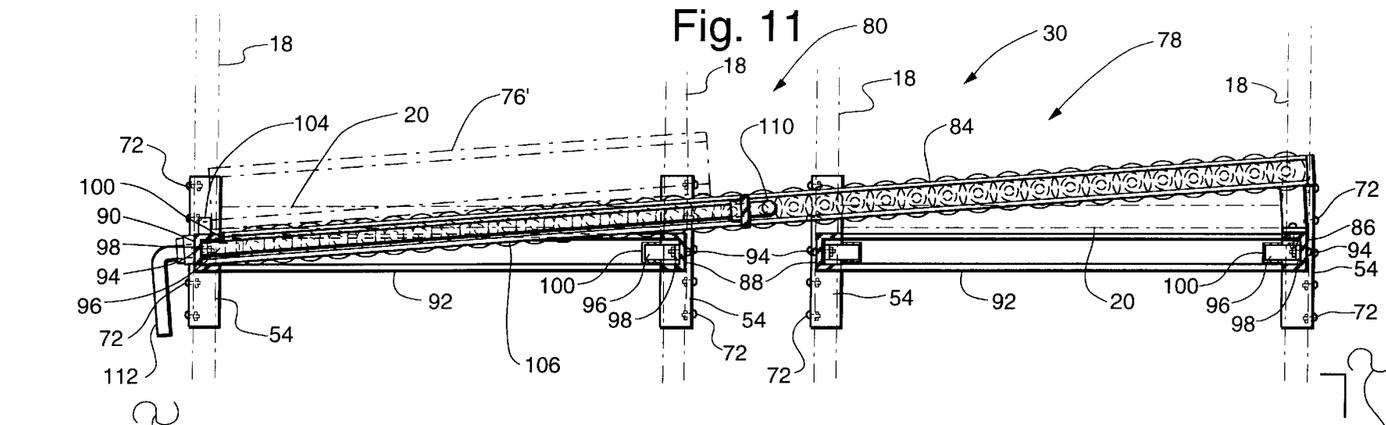
FIG. 11 is an enlarged side elevation view of the alternate embodiment split beam ergonomic pick rack inflow roller conveyor section side as shown in FIG. 10 and seen along the line 11—11 thereof.

Not apparent in the top plan view of FIG. 10, but therein shown by directional arrow "a" and clearly illustrated in FIGS. 11 and 12, is the inflow incline of the elongated roller conveyor members 84 whereby palletized loads placed thereon in a tandem relationship are roller conveyed forward. In order to control forward movement of tandemly positioned pallets on the roller conveyor members 84, a fixed set of upwardly projecting pallet stop bumpers 104 is provided at the forward facing delivery end of the laterally spaced inclined roller conveyor pallet storage support rack 80 of the elongated pallet storage bay 78, and to control and limit forward movement of a tandemly rearward pallet within the pallet storage support rack 80 it is further provided with a rotatably releasable pallet stop 106 which is shown in the release position in FIGS. 10 and 11 and in the rearward pallet stop position in FIG. 12.

As was previously pointed out on consideration of FIG. 1, the alternate embodiment split beam ergonomic pick rack 12 would typically be utilized in mezzanine areas and would be located with palletized re-supply of product being from the rearward fill aisle floor opening 108 as shown in FIG. 1.

Directing attention now to FIGS. 11 and 12 to consider in greater detail additional structural and functional features of the alternate embodiment split beam ergonomic pick rack 12, and in particular the inclined roller conveyor pallet storage inflow rack 80 side thereof. Both of the Figures of instant consideration show the forward sloped disposition of the elongated inclined roller conveyor members 84, and in FIG. 11 the rotatably releasable pallet stop 106 is shown disposed with the pallet stop extension 110 thereof rotated to a non-stop position so that a forward pick position pallet 76' loaded from the rearward fill aisle 108 is thereby enabled to self-convey down the roller conveyor members 84 to the forward pick position as limited by the upwardly projecting pallet stop bumpers 104. By utilization of handle 112 the pallet stop extension 110 is then rotated to the stop position as shown in FIG. 12 so that a second pallet 76 which is tandem loaded from the rearward fill aisle 108 will self-convey down the roller conveyor members 84 to the reserve position as limited by the upwardly projecting pallet stop extension 110. Upon depletion of product from the forward pick position pallet 76', the rotatably releasable pallet stop 106 is then operated to again position the pallet stop extension 110 in the non-stop configuration as shown in FIG. 11, and the reserve position pallet self-conveys forward to the pick position as also shown in FIG. 11.

Figure 13:
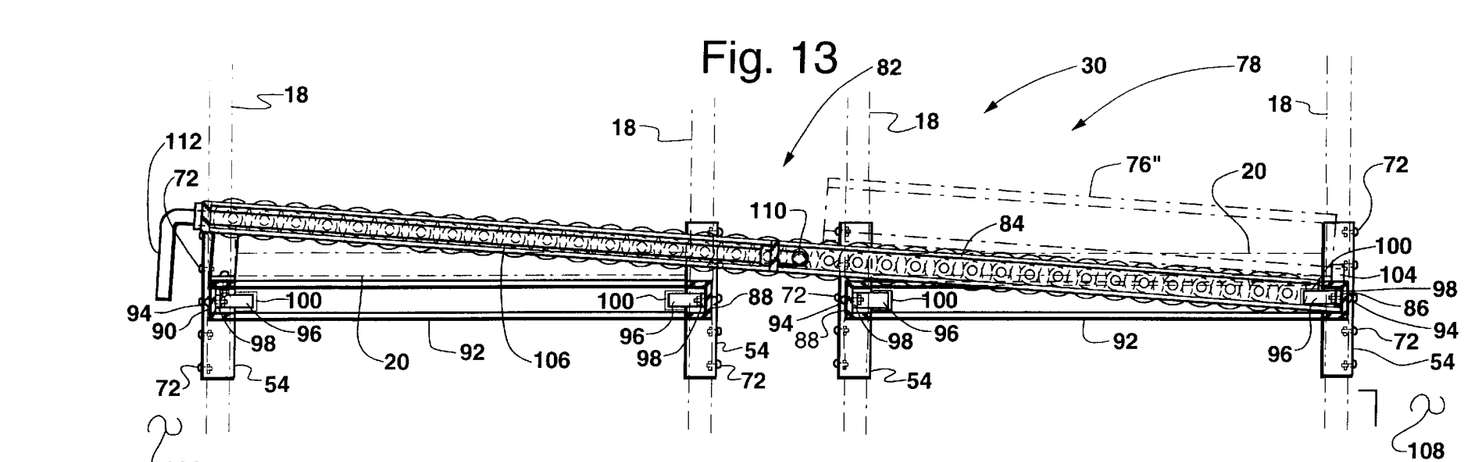
FIG. 13 is an enlarged side elevation view of the alternate embodiment split beam ergonomic pick rack outflow roller conveyor section side as shown in FIG. 10 and seen along the line 13—13 thereof.

Considering now FIGS. 13 and 14 in a greater detail description of the structural and functional features of the inclined roller conveyor pallet storage support outflow rack 82 side of the alternate embodiment split beam ergonomic pick rack 12. Therein, both of the Figures of current consideration show the outward sloped disposition of the elongated inclined roller conveyor members 84, and in FIG. 13 the rotatably releasable pallet stop 106 is shown with the pallet stop extension 110 thereof rotated to a non-stop position so that a pallet placed on the inclined roller conveyor members 84 rolls forward to engagement with the upwardly projecting pallet stop bumpers 104, to the aisle forward 76" position, whereby interim storage thereof is provided with subsequent removal by access from the rearward fill aisle 108 position. By utilization of handle 112 the pallet stop extension 110 may be rotated to the stop position as shown in FIG. 14 so that a second pallet 76 loaded in tandem from the rearward fill aisle 108 will self-convey down the roller conveyor members 84 into stoppable engagement with the pallet stop extension 110, and is thereby held in a reserve removable interim storage condition. Upon removal of the aisle forward pallet 76", that storage position may be re-filled with another pallet by access from the rearward fill aisle 108, or the rotatably releasable pallet stop 106 may be operated to again position the pallet stop extension 110 into the non-stop configuration as was previously shown in FIG. 13, and the reserve position pallet will self-conveys forward to the aisle forward position as also shown in FIG. 13.

Turning attention lastly to FIG. 15, which is a pallet loaded top plan view corresponding to that as previously shown in FIG. 10, but herein illustrating the advantageous exemplary order picker worker 74 access features of the alternate embodiment split beam ergonomic pick rack 12 for accomplishing facilitated order picking procedures. As shown, in an elongated pallet storage bay 78, which embodies the alternate split beam ergonomic pick rack 12 structure, the spaced pair of inclined roller conveyor pallet storage support racks 80 inflow and 82 outflow provide the worker access opening 32 whereby an order picker worker 74 has not only reachable order picking access to product loaded upon the forward-facing aisle area 114 of a forward pick position pallet 76', but also passage access therebetween by means of said opening 32 for enhanced and facilitated order picking access to product loaded upon rear areas of the forward pick position pallet 76'. Thus, the alternate embodiment split beam ergonomic pick rack 12 structure hereof likewise accommodates worker 74 passage from the forward to along the sides and rear areas of the forward pick position pallets 76' stored on the inclined roller conveyor pallet storage support inflow rack 80 of said pick rack 12 structure to thereby provide greater worker 74 ease of safety and efficiency in accomplishing manual order picking procedures when retrieving palletized merchandise from in warehouse racked storage.

In summary, although the split beam ergonomic pick rack, an alternate embodiment invention hereof, the structural characteristics and methods of employment respectively thereof, have been shown and described in what are conceived to be the most pracical and preferred versions, it is recognized that departures may be made respectively therefrom within the scope of the invention, which is not to be limited per se to those specific details as described herein but is to be accorded the full scope of the claims so as to embrace any and all equivalent such devices, apparatus, and methods.

We claim:

1. A split beam ergonomic pack rack which provides an elongated pallet storage bay structure comprised of a laterally spaced set of pallet storage racks adapted to accommodate at least two sets of two pallets in tandem relation one to the other thereon. said split beam ergonomic pick rack comprising in combination with a warehouse rack support structure having an interconnected plurality of vertical support posts and horizontal support beams, a laterally spaced set of equal longitudinally dimensioned rearwardly projecting parallel leg members respectively connected at the rearward terminal ends thereof to a horizontal support beam of said warehouse rack support structure and connected at the forward ends respectively thereof to an equally laterally spaced, outward projecting, right-angled support and bumper beam, in turn being respectively connected in an abutting relationship at the outward terminal end thereof to a vertical rack support post of said warehouse rack support structure to form said elongated pallet storage bay structure comprised of said laterally spaced set of pallet storage racks provided with a parallel plurality of elongated inclined roller conveyor members which are provided, at the downward terminal ends thereof, laterally intermediate the inclined longitudinal lengths respectively thereof, with a set of rotatably releasable, upwardly projecting pallet stop members and an individual worker access opening between said equal longitudinally dimensioned rearwardly projecting parallel leg members formed by said lateral spacing therebetween.

2. A split beam ergonomic pick rack according to claim 1 in which one of said laterally spaced set of pallet storage racks has the sum total of said parallel plurality of elongated inclined roller conveyor members thereof inclined for pallet inflow delivery.

3. A split beam ergonomic pick rack according to claim 2 in which the other of said laterally spaced set of pallet storage racks has the sum total of said parallel plurality of elongated inclined roller conveyor members thereof inclined for pallet outflow delivery.

* * * * *